United States Patent [19]

Shankhla et al.

[11] Patent Number: 4,485,721
[45] Date of Patent: Dec. 4, 1984

[54] RIFLED FIBER REINFORCED GUN BARREL

[75] Inventors: Vikram S. Shankhla, Val St-Michel; Raymond Langlois, Loretteville, both of Canada

[73] Assignee: Her Majesty the Queen in right of Canada, as represented by the Minister of National Defence of Her Majesty's Canadian Government, Ottawa, Canada

[21] Appl. No.: 255,118

[22] Filed: Apr. 6, 1981

[30] Foreign Application Priority Data

Apr. 10, 1980 [CA] Canada .................................. 349507

[51] Int. Cl.³ ........................ F41F 17/04; F41F 17/08
[52] U.S. Cl. .......................................... 89/15; 89/16
[58] Field of Search .................... 42/76 A, 78; 89/15, 89/16

[56] References Cited

U.S. PATENT DOCUMENTS 3,571,962  3/1971  Eig .......................................... 89/16
3,641,870  2/1972  Eig .......................................... 89/15

*Primary Examiner*—Stephen C. Bentley
*Attorney, Agent, or Firm*—Stevens, Davis, Miller & Mosher

[57] ABSTRACT

A tubular structural element comprises a tubular body made of a fiber reinforced composite material having reinforcing fibers embedded in a matrix. The fibers are one of carbon, berylium, boron, glass, metallic or nonmetallic, or a hybridized combination of the same. The tubular body has projections interiorly thereof which are integral therewith, and are of the same or another fiber reinforced composite material. The reinforcing fibers in the body are oriented in mutual stress transmitting relation, preferably circumferentially in the tubular body, and longitudinally in the interior projections. In making the tubular structural element, the fiber reinforced composite is introduced into each channel formed in a mandrel. The channels extend generally longitudinally of the mandrel, and optionally may also be spirally or helically oriented. Additional composite material is then overlaid generally circumferentially on the mandrel, to a desired thickness. The material is cured, and then removed from the mandrel for any final processing desired.

1 Claim, 6 Drawing Figures

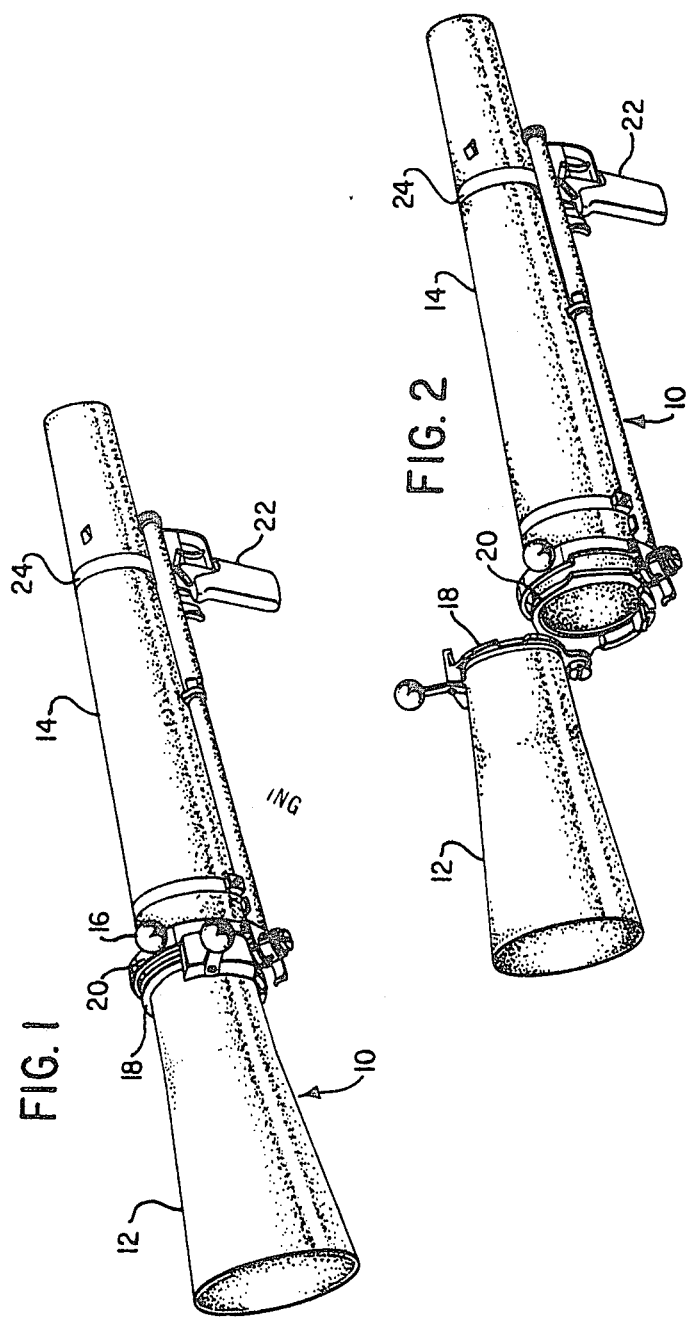

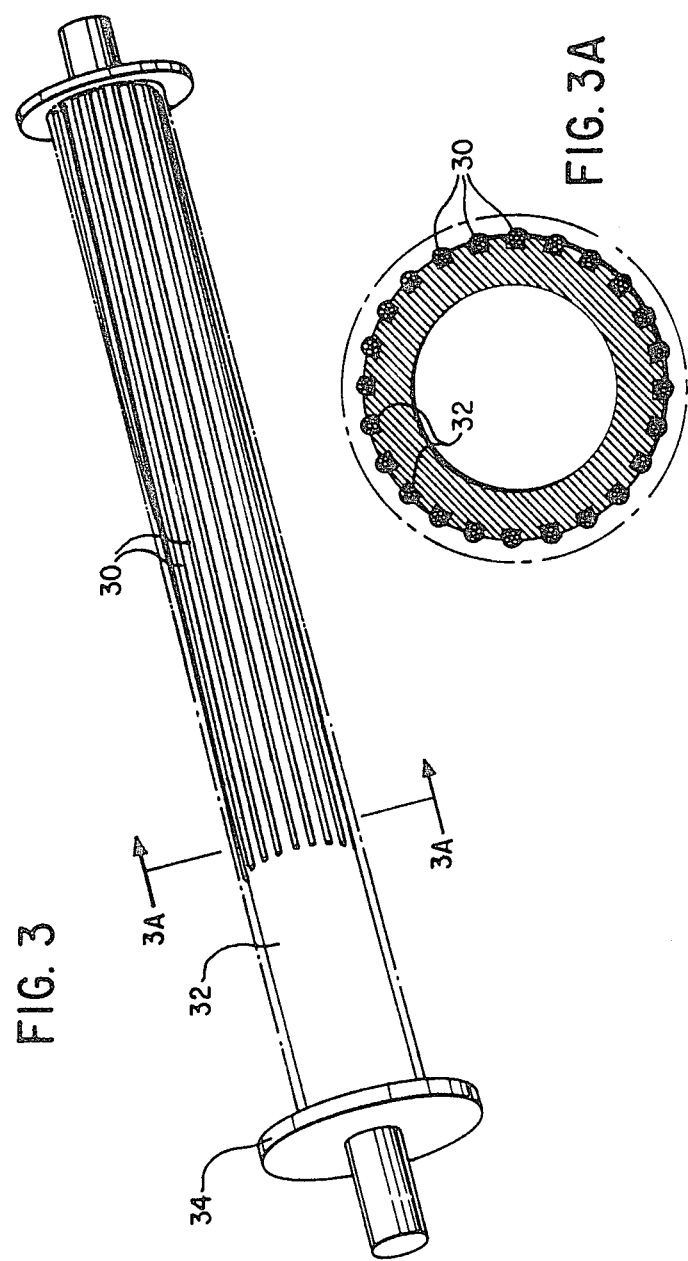

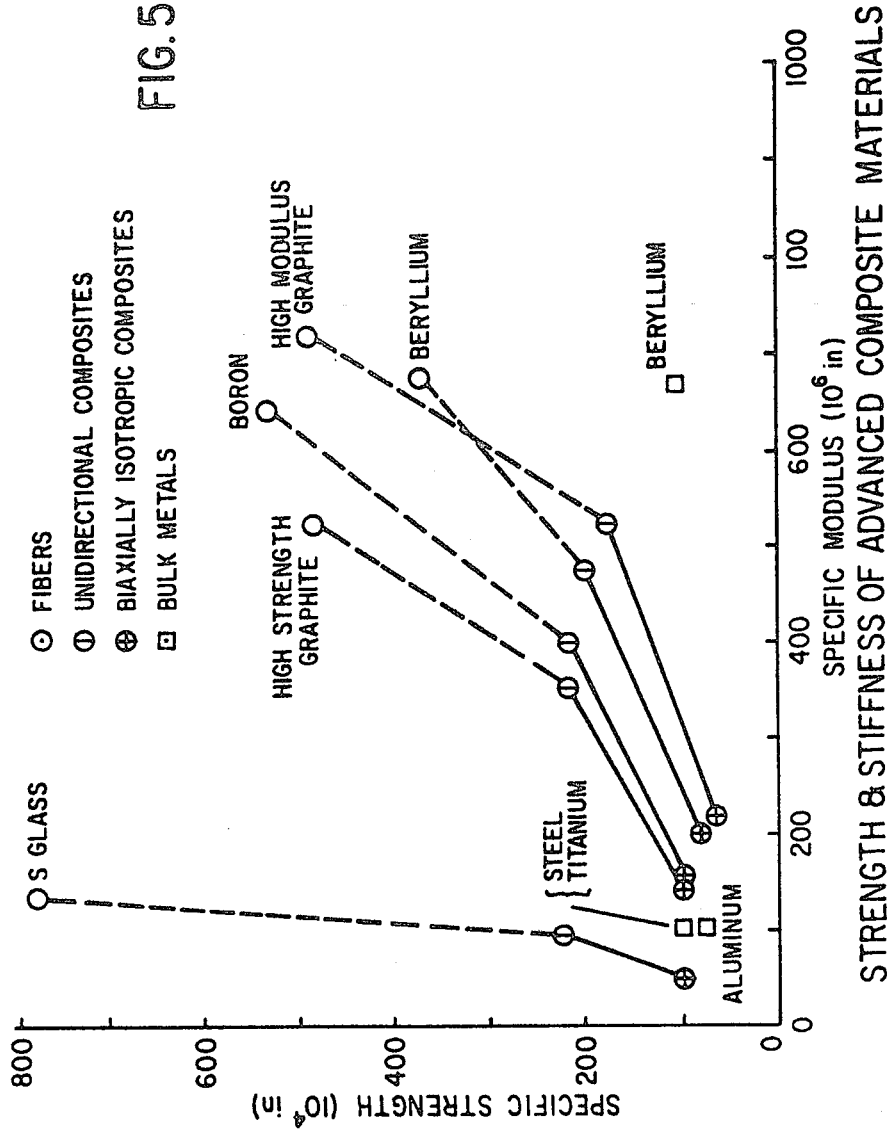

RIFLED FIBER REINFORCED GUN BARREL

This invention relates to a structural element in the form of a tubular item made of a fiber reinforced composite material. More particularly, the invention relates to a gun barrel, launcher, or like element, and the method of making the same from a fiber reinforced composite material.

Steel and steel alloys have previously been used extensively in tubular structural elements, gun barrels and the like where continuous or instantaneous internal pressures of high magnitudes are encountered. Some improvements have been suggested, particularly in attempts to reduce weight and/or costs. In this respect, glass fiber reinforcement has been tried out. Here, the reader is referred to Canadian Pat. No. 582,160 of Aug. 25, 1959, which issued to the Olin Mathieson Chemical Corporation. That patent discloses a light-weight barrel for firearms, etc. in which the barrel is of a composite material, and includes a metal liner. Thus, the barrel is made of glass fibers in a resin-type binder or matrix. The liner is described, for example, in column 2 at lines 44–50, as being of any suitable material "such as aluminium, steel, stainless steel, or titanium. . .". These are all metal liners. An oblique reference is made in column 7 at lines 44–48, to "suitable non-metallic material". It is emphatically stated here, however, that, that patent then remains totally silent as to what is envisaged as a "suitable non-metallic material".

Notwithstanding the express teaching of the above Canadian patent, the present invention provides a number of advantages and features not previously known. The novel structural element described herein and the method of making the same relatively inexpensive, and provide good reliability. A gun barrel made entirely of the fiber reinforced composite materials described herein is useful and operative in certain applications where the prior art taught only the use of barrels that were wholly or at least partly metallic. The tubular structural element envisaged herein is light in weight, yet strong enough to withstand the instantaneous barrel pressures generated in a projectile launcher system.

Accordingly, there is provided by one aspect of this invention a tubular structural element comprising a tubular body consisting of a fiber reinforced composite having reinforcing fibers embedded in a matrix, the fibers being oriented so as to be in mutual stress transmitting relation, and projections interiorly of the body and integral therewith. The projections are preferably of the same composite material as the body. In a more preferred form, the projections are riflings, each of which includes reinforcing fibers embedded therein. In a still more preferred form the reinforcing fibers in the tubular body are oriented at least generally circumferentially, and in the projections they are oriented generally parallel to the projections.

In another aspect of this invention, there is provided a method of making a tubular structural element comprising the steps of, providing a mandrel having at least one channel therein extending generally longitudinally of the same, introducing a matrix material, preferably a fiber reinforced composite consisting of reinforcing fibers mixed in a matrix, into each channel, applying additional fiber reinforced composite material to the mandrel so as to overlie each channel, the additional material being applied in a manner causing the reinforcing fibers to be oriented in mutually stress transmitting relation transversely of the channel, and curing the fiber composite material to form the tubular structural element as an integral body with at least one projection interiorly thereof. The projections are of the same shape as the channel on the mandrel. In a more preferred form of this aspect of the invention, the reinforcing fibers are of a predetermined length. Moreover, such fibers are preferably one of carbon, boron, berylium, glass metallic or non-metallic, or a hybridized combination thereof. Typically, the fibers are a combination of non-metallic fibers and are wound in a helical format around the mandrel.

These and other features and advantages of the invention will become more apparent from the description below. That description is to be read in conjunction with the accompanying drawings which illustrate one preferred embodiment of this invention.

In drawings:

FIG. 1 is an elevational view showing in perspective one preferred embodiment of this invention;

FIG. 2 is also an elevational view showing the preferred embodiment of FIG. 1 in a "breach open" condition;

FIGS. 3 and 3a are a schematic view showing one form of mandrel on which the embodiment of FIGS. 1 and 2 can be made, and a cross-section on 3a—3a of FIG. 3;

FIG. 5 is a graphical comparison of a number of reinforcing materials, with certain bulk metals.

DESCRIPTION OF A PREFERRED EMBODIMENT

Figure 4:
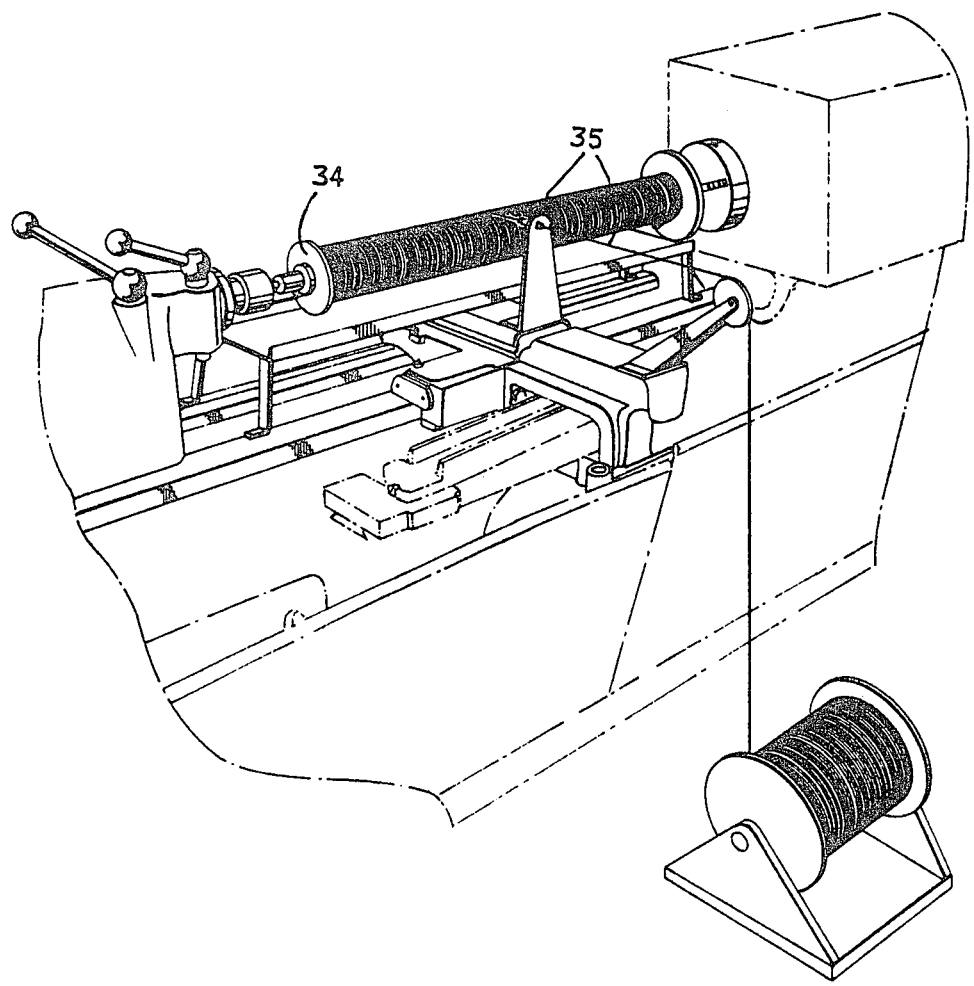
FIG. 4 is another schematic view to show the mandrel of FIG. 3 mounted so as to allow it to be rotated for application thereto of reinforcing fiber of indeterminate length.

Turning to the drawings, FIG. 1 shows a structural element in the form of a "barrel" or a recoiless weapon 10. A venturi section 12 and a barrel section 14 are coupled together by a breech assembly 16. The breech assembly 16 is totally conventional in form, and need not be further described here for an understanding of this invention. It is noted that the breech assembly 16 includes a two part base ring, whose parts 18 and 20 fixedly support the diffuser and pressure sections 12 and 14. The parts 18 and 20 are interconnected so as to provide for relative movement, and enable loading of the barrel 14. This is clearly seen by comparing FIG. 1 showing the barrel with the breech assembly 16 closed, and FIG. 2 in which the breech assembly is open. The recoiless weapon 10 shown in FIGS. 1 and 2 includes a trigger and firing mechanism 22 supported from the pressure section 14 by a support strap or ring 24. There are also conventional in the recoiless weapons art and need not be further described here.

We have found, contrary to teachings of the prior art such as Canadian Pat. No. 582,160, that a unitary barrel construction can be made from fiber reinforced composite material. Moreover, such a barrel need not use metal liners. It is noted from FIG. 5, that reinforcing fibers such as graphite (carbon), boron, and berylium, as well as glass have, in certain forms, greatly superior strength and stiffness properties as compared to bulk metals such as steel, titanium or aluminum. It is known, of course, that alloys of those metals are commonly used in making gun barrels. As mentioned earlier, conventional wisdom previously required that barrels be made entirely of metal, or at least use a metal liner, overwrapped, perhaps with reinforcing glass fiber.

We have found, however, that barrels acceptable for use in recoiless weapons can be made and used without the need for a liner, metallic or otherwise. Such a barrel is made in the form of a tubular structural element of a fiber reinforced composite material, in which a barrel and interior projections (riflings or the like) are integrally formed as a unitary structure. Thus, turning to FIGS. 3 and 3a, commercially available carbon fiber 30 in the form of a "yarn" or "rope", was introduced into channels 32 formed in a mandrel 34. The mandrel 34 is typically of a metal, steel or aluminum. Further, the mandrel 34 may be tubular or solid, at the choice of the user. It is to be noted, however, that the volumne and thermal expansibility of the mandrel material must be taken into account to ensure fabrication of a structural element whose final dimensions are those required. It will be evident, of course, that such final dimensions are derived when both the mandrel and composite material thereon are at curing temperatures. At room temperatures the dimensions of the mandrel will normally be somewhat less than those at curing temperatures.

Channels 32 are preferably generally rectangular in cross-sectional shape. However, a slight narrowing to the bottom of the channel is provided to accomodate, with releasing materials, or powders, easy removal of the structural element after curing. The channels 32 extend generally longitudinally of mandrel 34, and preferably helically thereof. Typically, these channels are spaced equally apart around the circumference of the mandrel 34.

Thus, the "rope" of carbon fibers 30 is coated with a resin, for example, a commercially available epoxy resin, and laid lengthwise into channels 32. The channel is filled until the fiber composite material buldges outwardly therefrom. The reasons for this will become apparent shortly. The mandrel 34 with channels 32 now filled (actually overfilled) is mounted on a lathe-bed or the like to enable it to be rotated. Additional fiber reinforced composite material 35 is now fed onto the mandrel to overlay the same, including the overfilled channels 32. As seen from FIG. 4, the additional fiber material 35 is fed from a spool, or other like source, and wound or wrapped around the rotating mandrel 34. This additional reinforcing fiber material is preferably coated with the same matrix material used earlier.

The fiber material is oriented generally circumferentially of the mandrel 34, with the fibers being in mutually stress transmitting relation to one another, and transversely of the channels 32. Preferably, this additional fiber composite material is helically wound about the mandrel. The additional material is built up to the thickness desired. The winding of this additional material is preferably done using alternating layers oriented fully circumferentially, and angled, i.e., spirally or helically. Such an arrangement yields desired strength properties in predetermined directions. The reinforcing fiber is preferably of a predetermined length for use in the channels 32, and of indeterminate length, wound off a spool etc. for overlaying the filled channels and mandrel. Alternatively, the reinforcing fiber may be in chopped or staple form, or a rovings. Further yet, the reinforcing fiber being applied as an overlap (prior to curing) can be in the form of tape or cloth of a selected width and finite or infinite length.

The mandrel is then removed from the lathe and simply placed in an oven for curing of the matrix of the composite material. In some instances the temperatures and time for curing were from about 270° F. to 310° F. for up to 8–16 hours. With newer resins and preimpregnated fibers, the curing times can be reduced to, say, 2–3 hours and perhaps less. It is noted that with a tubular mandrel, or one with heating means built right into it, cure times can be minimized to a fraction of the times first mentioned above. Upon curing, a unitary structural element is formed, with the tubular body having internal projections integral therewith.

After curing, the tubular structural element is removed by applying pressure and sliding it longitudinally of the mandrel. Some machining or similar processing of the exterior surface is done last to provide a more uniformly smooth/configured shape.

Since the diffuser and pressure sections 12 and 14 are separate physically, being interconnected by the breech assembly 16, they are preferably made using separate mandrels.

We have found that the bonding together and curing to an integral structure, of the composite fiber material in the overfilled channels with the overlying additional composite material gives excellent strength properties. It is known that riflings in a gun barrel must be resistant not only to wear, but particularly to shear forces. Shear forces are derived from the projectile etc having spin imposed on it due to engagement with helically oriented riflings, as the projectile is moving down the barrel of the gun. In the present instance, the rounded buldge of overfilling at the base of the channel provides an enlarged surface area through which to transmit the shear loads in a cured finished barrel. As described above, the reinforcing fibers introduced with resinous matrix material into the channels, are preferably oriented generally longitudinally, i.e., parallel, to the channels. Such fibers typically are of predetermined length approximating that of the barrel. Alternatively, chopped fibers could be used, with random orientation. It is noted however, that chopped fibers introduced with a matrix material in which they are mixed can be fed from a tube, spout or the like. In those instances the chopped fibers could remain randomly oriented, or possibly acquire a degree of alignment with the discharge of composite material. While not essential to practice this invention successfully, it is noted that fibers oriented parallel to the shear force will provide greater resistance to shear than with other orientation.

The primary application of tubular structural elements according to this invention is envisaged in a projectile launcher system. As such, it is also preferable to launch projectiles from such a weapon, with induced spin. The projections interiorly of the tubular structural element are accordingly disposed helically, to impose the desired spin as the projectile travels down the launch tube. To derive spin most rounds carry some form of rider or driving band around their circumference. In respect of a gun barrel constructed according to this invention, such driving bands must be made of a material that is more ductile or deformable than the composite material of which the riflings, i.e., interior projections are made. Excessive wear and/or damage of the riflings will otherwise result.

The strength properties of fiber composite materials envisaged herein are most impressive. We have found that a barrel constructed according to this invention, readily withstands numerous firings with wear that is quite acceptable. Test firings to date have been with "open tube" barrels. In these, a membrane associated with the round itself withstands initial pressures generated to "launch" or fire the round. That membrane ruptures at a predetermined pressure, well below the pressure levels that would damage the present reinforced fiber composite tube. Indeed, our experience leads us to expect that the present fiber reinforced composite tube can also be used in a "closed" barrel. Further yet, we believe that a fiber reinforced composite barrel could be made in which the projections, i.e., riflings are made of only the matrix material, integral with the barrel. In other words, it is not essential that the projections contain reinforcing fiber. Still further, the projections can be of a variety of cross-sectional shapes.

It is, therefore, intended to include within the scope of this invention all changes and modifications which would be obvious to practioners skilled in this art, and which fall within the scope of the claims below.

The embodiments of the invention in which an exclusive property or privilege is claimed are defined as follows:

1. A tubular barrel element for repeated use in a reloadable recoilless gun, wherein the barrel element comprises:

an unlined non-metallic tubular body made wholly of a composite material in which reinforcing fibers of carbon are embedded in a matrix of an epoxy resin;

said tubular body including riflings interiorly thereof operable during launch of a projectile from said gun to impose predetermined spin on the projectile each of said riflings including an enlarged base portion provided during fabrication to form an expanded area extending into the remainder of said tubular body and through which shear loads generated in the riflings durin firing of the projectile are transmitted into the remainder of the tubular body; and the carbon fibers beind disposed generally longitudinally along the riflings and circumferentially in the remainder of the body, with said tubular body being built up in thickness to provide stength properties in predetermined directions to withstand firings of said projectile under pressure and velocity conditions which confer sufficient kinetic energy to said projectile to reach its target.

* * * * *

UNITED STATES PATENT AND TRADEMARK OFFICE
CERTIFICATE OF CORRECTION

PATENT NO. : 4,485,721

DATED : December 4, 1984

INVENTOR(S) : Vikram S. SHANKHLA, et al

It is certified that error appears in the above—identified patent and that said Letters Patent is hereby corrected as shown below:

On the first page (title page)

Under "References Cited" the list of "U.S. Patent Documents" should include as its first items:
-- 3,298,279  1/1967  Barnet, et al    42/76A
   3,517,585  6/1970  Slade            89/15 -- .

Column 6, line 14, "durin" should read -- during --.

Column 6, line 17, "beind" should read -- being --.

Signed and Sealed this

Thirteenth Day of August 1985

[SEAL]

Attest:

DONALD J. QUIGG

Attesting Officer   Acting Commissioner of Patents and Trademarks